July 12, 1966
A. H. BORMAN, JR
3,260,331
DRIVE SUSTAINING DEVICE
Filed Dec. 9, 1963
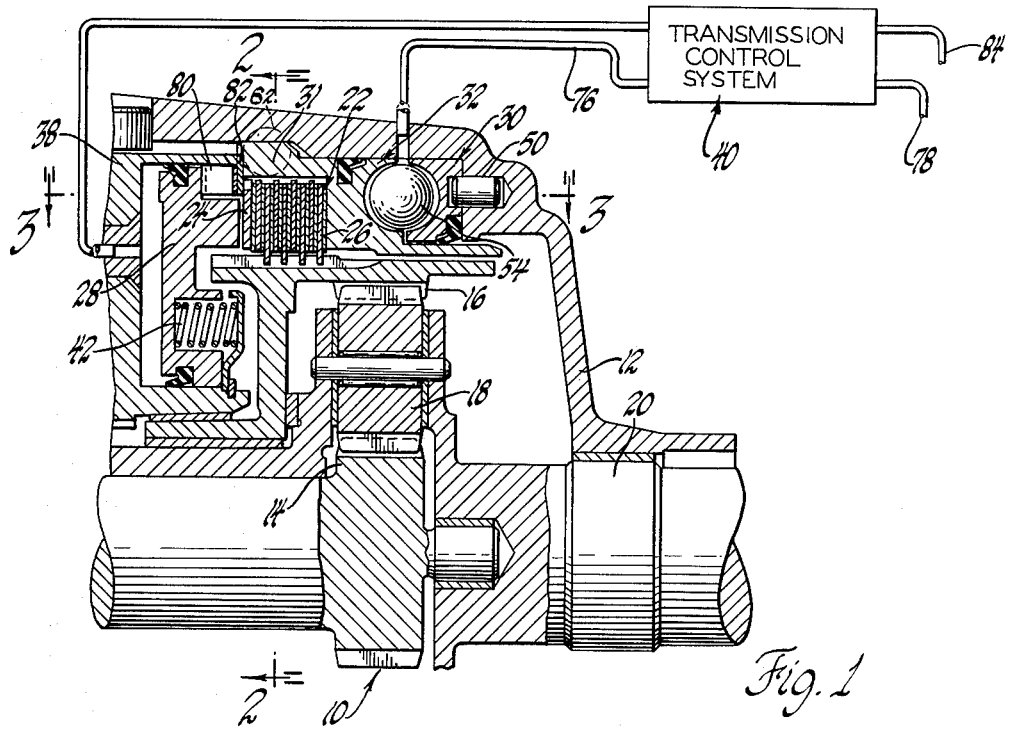
Fig. 1
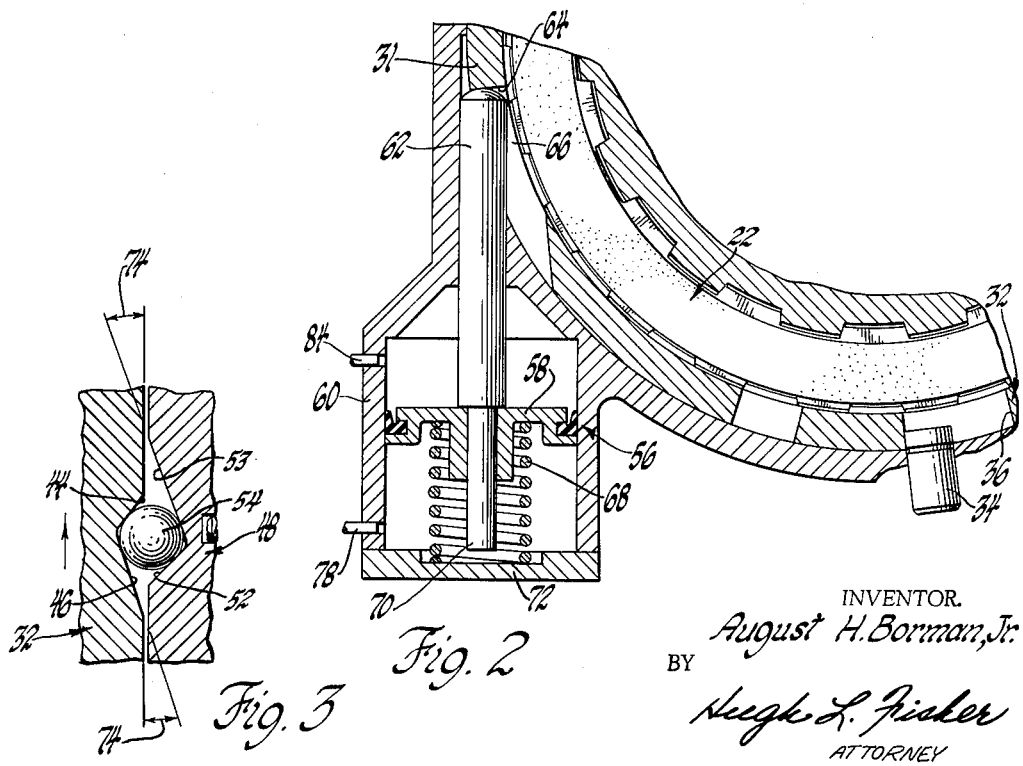
Fig. 2
Fig. 3
INVENTOR.
August H. Borman, Jr.
BY
Hugh L. Fisher
ATTORNEY

United States Patent Office 3,260,331
Patented July 12, 1966

3,260,331
DRIVE SUSTAINING DEVICE
August H. Borman, Jr., Detroit, Mich., assignor to General Motors Corporation, Detroit, Mich., a corporation of Delaware
Filed Dec. 9, 1963, Ser. No. 328,902
3 Claims. (Cl. 188—72)

This invention relates generally to drive sustaining devices of a character suited for use, although not exclusively, with power transmitting clutches and brakes.

In the shifting type of automatic vehicle transmission, smooth shifts are always a problem. To avoid complex timing controls, fluid couplings and one-way brakes have often been combined. By nature, as a fluid coupling assumes torque, a cooperating one-way brake will release torque. There is virtually no timing problem because the action of one complements the other and there is a gradual and smooth transition from one drive ratio to another. This combination does not, however, represent a complete solution to the problem because one-way brakes present disadvantages. One-way brakes, of course, are only effective in one direction, but more significantly they are usually formed from a large number of expensive parts and they must generally be placed beside a gear unit thus consuming valuable axial transmission space.

Accordingly, a novel drive sustaining device is proposed that consumes a minimum space, that assumes torque loads gradually, that does not require expensive and precision parts, and that is always prepared to operate. More specifically, the drive sustaining device incorporates relatively movable races between which are installed cam elements that by a novel arrangement are always prepared to become effective. This novel arrangement includes a unique provision for applying a minimum torque to one of the races for energization purposes.

The foregoing and other objects and advantages of the invention will be apparent from the following description and from the accompanying drawings, in which:

FIGURE 1 is a sectional view of a part of a transmission along with a schematic showing of a fluid pressure system for use therewith;

FIGURE 2 is a sectional view of the transmission taken along the line 2—2 of FIGURE 1; and FIGURE 3 is a sectional view of an energizing device for the brake taken along the line 3—3 of FIGURE 1.

Referring now to the drawings in detail and initially to FIGURE 1, the numeral 10 denotes generally a planetary gear unit that is housed within a transmission casing 12. The planetary gear unit 10 includes an input sun gear 14, a ring gear 16, one or more planet pinions 18 intermeshed with the sun and ring gears 14 and 16, and an output planet carrier 20 for revolvably supporting the planet pinions 18. As is well known the planetary gear unit 10 can, with the sun gear 14 serving as an input and the ring gear 16 as a reactor, produce a reduction drive; i.e. the output planet carrier 20 will be driven at a slower speed than the input sun gear 14. On the other hand, by locking or joining together two parts of the gear unit 10, such as the sun gear 14 and the planet carrier 20, the gear unit 10 will provide a direct drive ratio between the input sun gear 14 and the output planet carrier 20.

The drive sustaining device for conditioning the gear unit 10 for a reduction drive is in this embodiment a disk type friction brake, which is generally denoted at 22. The friction brake 22 includes a series of friction elements, such as stator plates or disks 24 and rotor plates or disks 26, shown interleaved between a reaction piston 28 and an energizing mechanism, designated generally at 30. The rotor disks 26 are splined or otherwise connected to the ring gear 16 and the stator disks 24 are also splined or otherwise joined to an extension 31 of a movable race 32 constituting a part of the energizing mechanism 30. The friction brake 22, in a way to be explained, connects the ring gear 16 to the race 32, which in turn through a dowel 34, best observed in FIGURE 2, is grounded to the transmission casing 12. By the arrangement illustrated in FIGURE 2, the race 32 is permitted to revolve within the limits defined by a slot 36 that receives the dowel 34. The race 32 is also, by connection to the casing 12, permitted to move axially.

Necessarily, in the embodiment of FIGURE 1, the disks 24 and 26 must be urged together or against an axially fixed abutment. This is the function of the neutral piston 28. Preferably the neutral piston 28 is slidably positioned within an enclosure 38 that is fixedly joined to the casing 12 and to which is supplied fluid under pressure from a transmission control system, viewed generally at 40. The neutral piston 28 is urged to the brake disengaged position or to the left of the position shown in FIGURE 1 by one or more coil springs 42. When pressure fluid acts upon the face of the neutral piston 28, the neutral piston 28 will move rightwardly and to the illustrated brake-engaged position. In the brake-engaged position the piston 28 affords a stop against which the energizing mechanism 30, as will be discussed, urges the disks 24 and 26 and, hence, effects an engagement of the brake 22.

Another purpose of the neutral piston 28 is that at any time it is desired, pressure fluid application thereof can be canceled. When this happens, a true neutral condition for the gear unit 10 is achieved, there being no possibility of transferring drive therethrough because there is a complete absence of any reaction.

Considering now the details of the energizing mechanism 30, it has been mentioned that the one race 32 is grounded to the transmission casing 12 through the agency of the dowel 34 and further, that the race 32 has limited rotational movement due to the provision of the slot 36. The movable race 32 also is mounted for axial movement and is provided with a series of pockets 44, as seen in FIGURE 3, having cam surfaces 46. Confronting this movable race 32 is a similar race 48 fixedly joined to the transmission casing 12 by a dowel 50. The fixed race 48 is not intended to have either axial or revolvable movement. This fixed race 48 has pockets 52 confronting the pockets 44, each having a similar cam surface 53. Within the spaces defined by these pockets 44 and 52 are cam elements, as balls 54. As can be appreciated from inspection of FIGURE 3, any attempt to revolve the movable race 32 in the direction of the arrow will result in a camming action due to the balls 54 tending to climb the cam surfaces 53 and, therefore, an axial force is applied to the movable race 32. This axial force is in turn translated into movement of the movable race 32 in an axial direction such that the brake 22 is engaged.

To insure that the energization mechanism 30 is always prepared to operate, it is necessary, similar to a one-way device, to insure that the balls 54 are in engagement with the cam surfaces 46 and 53 of each of the pockets 44 and 52. This can be done by applying an axial force to the movable race 32 from a suitable element. However, there is usually frictional contact between any such element and the movable race 32 so that this frictional contact in itself inhibits the twist or turning moment needed to effect or maintain the movable race 32 in readiness for operation. Then too, dimensional tolerances can produce a situation where the balls 54 are out of engagement with the cam surfaces 46 and 53. Consequently, there will be no response by the energization mechanism 30 until the angular movement of the movable member 32 is sufficient to produce the required contact. This results in a delay in the response and usually produces an abrupt brake engagement.

To overcome these problems the energizing mechanism 30 includes a motor viewed generally at 56 for applying a turning moment to the movable race 32. The motor 56 has a piston 58 slidable within the bore of a housing 60. The piston 58 is attached to a piston rod 62 that extends externally of the motor 56 and into engagement with a surface 64 formed at the periphery of the movable race 32. As illustrated in FIGURE 2, this is accomplished by removing a portion of the extension 31 as at 66. The piston 58 is urged upwardly by a spring 68 and, when the reaction torque is removed from the gear unit 10, is moved downwardly until the piston rod end 70 engages a cover 72 for the housing 60. If wanted, the spring 68 can be replaced by pressure fluid.

Operationally, the energizing mechanism 30 due to the force from the spring 68 will always act on the movable member 32 and produce a twist or turning moment that will cause the race 32 to be urged toward a position in which the races 32 and 48 are at their furthest axial displacement. In other words, the motor 56 provides the torque needed both to maintain the energizing mechanism 30 ready to operate and to actually encourage operation in insuring that the balls 54 are in engagement with the cam surfaces 46 and 53 in the pockets 44 and 52 and that there is a slight "tickling" engagement between the race 32 and the adjacent brake disk 26 at the time when the brake 22 is expected to engage. This facilitates an instant response without introducing any external frictional forces that would otherwise interfere.

Consequently, with drive to the sun gear 14 in the forward direction, the backward rotational tendency of the ring gear 16 is immediately transferred through the disks 24 and 26 and, because of the "tickling" engagement, to the movable race 32. This twist is in addition to that afforded by the motor 56. Response is instantaneous and the movable race 32 is forced by the resultant cam action to the left in FIGURE 1 and to the brake-engaged position in which the backward rotation of the ring gear 16 is completely halted.

Now if the output carrier 20 receives the drive, as happens when the vehicle wheels commence to drive during coast, there is a reversal of reaction such that the torque applied to the ring gear 16 can be considered as being positive or that which tends to drive it forward. This immediately unlocks the energization mechanism 30 since the turning force now is in the opposite direction of the arrow in FIGURE 3 and moves the piston rod 62 for the motor 56 to its lowermost position with the end 70 against the stop afforded by the cover 72. This opposing force from the spring 68 becomes quite negligible and does not interfere with this overrun. But when the torque imposed on the ring gear 16 is negative, this force from the spring 68 when magnified by the lever arm, which is equivalent to the radial distance from the rotational axis of the race 32 to the point of contact between the piston rod 62 and the surface 64 on the movable race 32, can afford quite a substantial turning moment. The amount of this turning moment or torque, of course, can be varied for different applications by merely altering the extent of the lever arm.

It is preferred that the energization mechanism 30 afford full energization. This means that once the brake 22 is engaged the force from this spring 68 can be completely eliminated and the energization mechanism 30 will retain its operative or brake-engaged position. To do this requires that the proper cam angles 74, shown in FIGURE 3, be selected to produce the normal loads required to maintain the energization mechanism 30 in the brake-engaged position and without supplementing from external forces. This angle is usually less than 15° and is subject to variables as is well understood by those skilled in the art.

An additional feature of the arrangement is the provision, if wanted, of a pressure fluid supply line 76 that would permit pressure fluid to be selectively supplied by the transmission control system 40 to the energization mechansim 30 between the races 32 and 48. This pressure fluid would exert such a force that the movable race 32 would stay in its locked or the brake-engaged position at all times even during overrun. This would avoid a free wheel condition. In the alternative, pressure fluid could be supplied by a line 78 to the underside of the piston 58 and supplement the force from the spring 68 such that again the movable race 32 would be maintained in its locked or brake-engaged position.

If for some reason the reaction gear 16 in a certain installation still has a slight negative torque imposed thereon perhaps due to gear compounding, a spring 80 can be installed on the periphery of the neutral piston 28, as illustrated in FIGURE 1, and act through a stop plate 82 to urge the movable race 32 toward the disengaged position. This prevents an inadvertent engagement prior to the time when the friction brake is to be engaged. Of course, at this time the negative torque will exceed a certain value. Along with this, pressure fluid can be supplied via a line 84 to the top of the piston 58 so as to remove the energization, again until the friction brake 22 is to be engaged.

From the foregoing it will be appreciated that a simple, uncomplicated structure is afforded for operating a brake. The energization mechanism can, as in FIGURE 1, easily be installed above a gear unit and hence does not require any axial space, which is usually unavailable, the responsiveness of the energization mechanism 30 and accordingly the brake 22 is considerably enhanced by the provision for applying a constant torque to the movable face 32, such constant torque being negligible during overrun. This avoids the interference from frictional forces and keeps the balls 54 in engagement with the cam surfaces on the pockets 46 and 52.

The invention may be limited only by the following claims.

What is claimed is:

1. In a drive sustaining device, the combination of a series of friction elements, reaction motor means for providing a movable abutment for the friction elements, the reaction motor means being operative to change the device from an inoperative and neutral state to an operative state, energizing means operative to urge the elements against the reaction motor means and into torque transmitting engagement thus establishing the operative state of the device, the energizing means including a pair of races each having a recess therein, a cam element positioned within each recess, the recesses both having a cam angle so formed that the energizing means can cause the drive sustaining device to sustain an applied torque due to the camming action alone between the recesses and the cam element, and initiating means including a motor means remotely positioned from one of the races and having an element biased into engagement with the one race at a certain radial distance from the rotational axis thereof so as to apply a certain relatively constant tangential force thereto for causing the one race to be revolved enough to render the energizing means capable of sustaining torque in one direction, and control means operable for supplying fluid pressure to the motor means selectively for supplementing the constant tangential force thus rendering the energizing means capable of also sustaining torque in the opposite direction and for overcoming the constant tangential force thereby rendering the energizing means incapable of sustaining torque.

2. In a vehicle transmission brake, the combination of a series of friction elements, reaction means providing an abutment for the friction elements, the reaction means including a fluid pressure operated piston member adapted to impart axial movement of the friction elements in one axial direction so as to change the brake from an inoperative and neutral state to an operative state, energizing means urging the friction elements in an opposite axial direction and toward the reaction means thereby establishing the operative state so as to render the brake capable of sustaining torque in one direction, the energizing means including a stationary race, a revolvable and axially shiftable race, the races each having circumferentially aligned pockets, and a cam element within the pockets adapted to cause the movable race to urge the friction elements toward the reaction means upon initiation of torque transmission by the brake and thereby complete the engagement of the brake, initiating means including motor means applying a constant energization torque to one of the races so as to initiate operation of the energizing means, and control means for supplying fluid pressure to the motor means so as to cause the constant energization torque selectively to be supplemented thereby rendering the energization means capable of sustaining torque in either direction and to be overcome thereby rendering the energization means incapable of sustaining torque.

3. In a vehicle transmission brake, the combination of a series of friction disks, reaction means including a fluid pressure operated piston member adapted to impart axial movement to the friction disks in one direction so as to change the friction device from an inoperative and neutral state to an operative state, energizing means urging the friction disks toward the reaction means thereby rendering the brake operative and capable of sustaining torque in one direction, the energizing means including a stationary race and a revolvable and axially movable race, the races having circumferentially aligned pockets and a ball within the pockets adapted to cause the movable member to urge the friction disks toward the reaction means upon initiation of torque assumption by the brake and complete engagement of the brake, the movable race being also adapted to serve as a piston and be urged axially by fluid pressure toward the reaction means, and means initiating movement of the rotatable and axially movable race from a disengaged position so as to render the ball effective and thereby cause the energizing means to become self sustaining, the initiating means including a motor remotely positioned from the movable race and having a housing, a piston slidably mounted within the housing and including a stem engageable with the movable race at a certain radial distance from the rotational axis thereof and a spring for biasing the piston to an energized position from a deenergized position so as to cause a constant tangential force to be applied to the movable race adequate to rotate the movable race and cause axial movement thereof from the disengaged position so as to render the energizing means operative to sustain torque in the one direction, means urging the movable race to the disengaged position until a certain torque is imposed thereon in the one direction, and control means operable to supply fluid pressure to the motor so as to selectively urge the piston to the deenergized position and to supplement the bias of the spring in urging the piston to the energized position.

References Cited by the Examiner
UNITED STATES PATENTS

| | | | |
|---|---|---|---|
| 1,548,394 | 8/1925 | Sumner | 188—170 |
| 2,422,713 | 6/1947 | Benson | 188—72 |
| 2,870,655 | 1/1959 | Rockwell | 74—785 |
| 2,937,721 | 5/1960 | Parrett | 188—72 |
| 2,992,705 | 7/1961 | Chisnell et al. | 188—72 |
| 3,096,855 | 7/1963 | Burnett | 188—72 |
| 3,106,268 | 10/1963 | Christenson et al. | 188—72 |

MILTON BUCHLER, *Primary Examiner.*

EUGENE G. BOTZ, ARTHUR L. LA POINT, FERGUS S. MIDDLETON, *Examiners.*

G. E. A. HALVOSA, *Assistant Examiner.*